United States Patent
El Hachem et al.

(10) Patent No.: US 7,497,145 B2
(45) Date of Patent: Mar. 3, 2009

(54) PRELOADED-CAM FOLLOWER ARRANGEMENT

(75) Inventors: Hachem El Hachem, Lynchburg, VA (US); Kerry Dale Murphy, Lynchburg, VA (US)

(73) Assignee: Belvac Production Machinery, Inc., Lynchburg, VA (US)

( * ) Notice: Subject to any disclaimer, the term of this patent is extended or adjusted under 35 U.S.C. 154(b) by 406 days.

(21) Appl. No.: 11/319,210

(22) Filed: Dec. 28, 2005

(65) Prior Publication Data

US 2007/0144304 A1     Jun. 28, 2007

(51) Int. Cl.
   *F16H 53/06*     (2006.01)
(52) U.S. Cl. ........................ 74/569; 72/452.6
(58) Field of Classification Search ............ 74/567, 74/569
   See application file for complete search history.

(56) References Cited

U.S. PATENT DOCUMENTS

| | | | | |
|---|---|---|---|---|
| 3,661,007 A * | 5/1972 | Benedict | ...... | 72/421 |
| 4,437,374 A * | 3/1984 | Borzym | ...... | 83/454 |
| 4,924,693 A * | 5/1990 | College et al. | ...... | 72/453.03 |
| 5,433,098 A * | 7/1995 | Bowlin et al. | ...... | 72/117 |
| 5,467,628 A * | 11/1995 | Bowlin et al. | ...... | 72/126 |
| 5,586,467 A * | 12/1996 | Weber | ...... | 74/57 |
| 5,676,006 A | 10/1997 | Marshall | | |
| 5,697,242 A * | 12/1997 | Halasz et al. | ...... | 72/117 |
| 6,061,900 A * | 5/2000 | Kano | ...... | 29/740 |
| 6,164,109 A * | 12/2000 | Bartosch | ...... | 72/94 |
| 6,167,743 B1 * | 1/2001 | Marritt et al. | ...... | 72/352 |
| 6,199,420 B1 * | 3/2001 | Bartosch | ...... | 72/94 |
| 6,293,003 B1 * | 9/2001 | Sakurai et al. | ...... | 29/740 |
| 6,393,938 B1 * | 5/2002 | Sahara et al. | ...... | 74/569 |
| 6,405,698 B1 * | 6/2002 | Steinmetz | ...... | 123/90.48 |
| 6,622,379 B1 * | 9/2003 | Kano | ...... | 29/740 |
| 6,669,614 B2 * | 12/2003 | Morden et al. | ...... | 493/102 |
| 6,694,843 B2 * | 2/2004 | Bartosch et al. | ...... | 74/569 |
| 7,093,572 B2 * | 8/2006 | Hendriksma et al. | ...... | 123/90.16 |
| 7,263,867 B2 * | 9/2007 | Bartosch et al. | ...... | 72/94 |

OTHER PUBLICATIONS

Belvac Production Machinery Technical Bulletin, Issue 8, vol. 7, Nov. 2004, 2 pages.

* cited by examiner

*Primary Examiner*—Richard W L Ridley
*Assistant Examiner*—Phillip Johnson
(74) *Attorney, Agent, or Firm*—Foley & Lardner LLP

(57) ABSTRACT

A cam follow arrangement has a rectangular-shaped through hole formed in an end portion of a ram member, the through hole having first and second opposed ends and a pair of parallel sides. A slider which is disposed in the rectangular-shaped through hole is configured to be slidable back and forth along the parallel sides toward and away the first and second ends. A spring is disposed between the slider and the first end of the rectangular-shaped through hole to bias the slider toward the second end of the rectangular-shaped through hole.

13 Claims, 11 Drawing Sheets

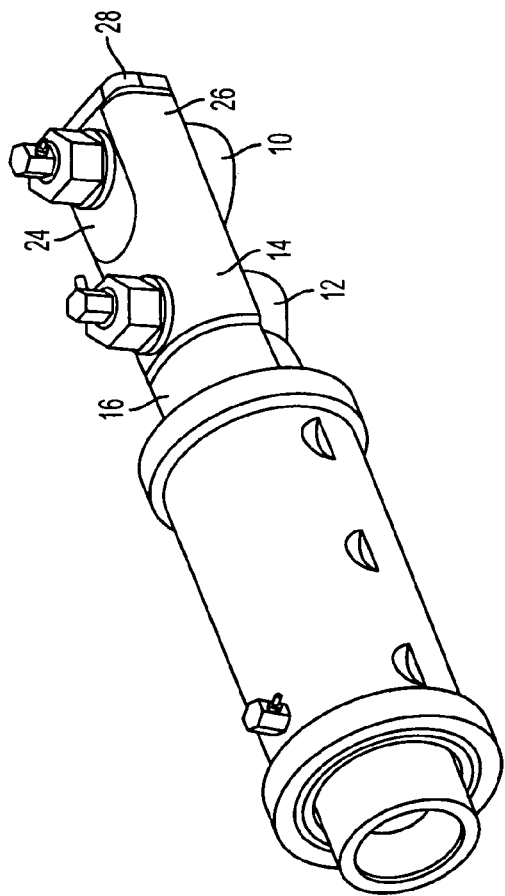
FIG. 10
PRIOR ART
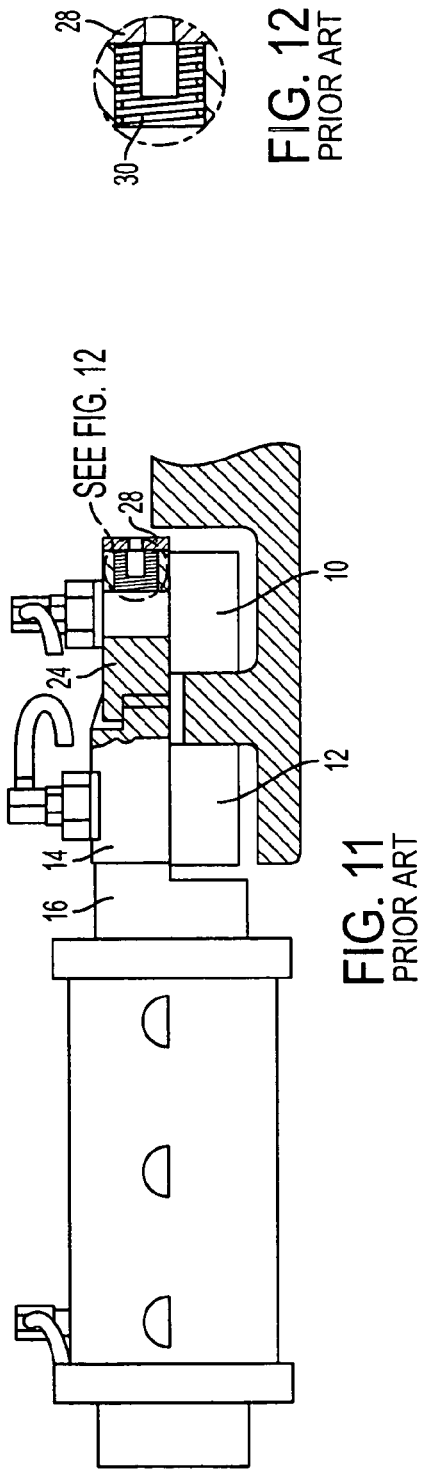
FIG. 12
PRIOR ART
FIG. 11
PRIOR ART

PRELOADED-CAM FOLLOWER ARRANGEMENT

BACKGROUND OF THE INVENTION

1. Field of the Invention

The present invention relates generally to a cam and cam follower arrangement and more specifically to a pre-loaded cam follower arrangement which exhibits both a long working life and which can be efficiently manufactured.

2. Brief Description of the Related Art

In certain types of machinery such as those which use helical cams and the like, it is necessary to use a cam follower which grips the cam and ensures that the cam profile is faithfully followed. One example of this type of cam follower is found in U.S. Pat. No. 5,676,006 issued to Marshall on Oct. 14, 1997. This patent discloses a preloaded-cam follower ram assembly for reshaping containers. The contents of this patent are hereby incorporated by reference thereto. Features of this arrangement are depicted in FIGS. 1-3.

As will be appreciated, this cam following arrangement includes first and second cam followers 10, 12. The second of these cam followers (12) is mounted on an end section 14 which is integral with a ram arrangement generally denoted by the numeral 16. The first cam follower (10), on the other hand, is supported on a pivotal member 18 that is operatively connected to the end of the end section 14 via a pivot pin 20. A cantilevered spring 22 is used to bias the pivotal member 18 to rotate in a direction which causes the first cam follower 10 to approach the second cam follower 12, and thus produce a nipper-like action that clamps the followers 10, 12 against the sides of cam member (not shown) when in use.

A further arrangement which has been developed is such that the cantilevered spring is replaced with a pack of conical springs. This arrangement is depicted in FIGS. 4-12. This arrangement has been found to extend cam follower life. As will be best appreciated from FIG. 4, this arrangement features a fork construction 23 which is configured to have a slide block (slider) 24 slidably received therein. The fork fingers 26 and the slider 24 have a tongue (261) and groove (262) arrangement (see FIG. 5 for example) which retains the slider 24 within the fork 23 while permitting the required reciprocal movement.

The ends of the fork fingers 264, which are located at the open end of the fork 23, are connected by an end cap 28. A conical spring pack 30 (see FIG. 12) is disposed between the end cap 28 and one end of the slider 24 to bias the slider 24 away from the end cap 28 and toward the closed end 231 of the fork 23.

However, as will be appreciated, very tight tolerances must be maintained to ensure that the slide block or slider 24 is freely movable in the axial direction, but does not have any clearance that permits rocking of the cam follower on the cam face under dynamic loading. To achieve this, the clearance required must be held in multiple planes, and is provided by the tongue in groove arrangement.

The end cap 28 has the ability, when connected to the ends of the forks, to either hold the fingers 26 in a slightly inwardly flexed condition or in a slightly outwardly flexed state, if necessary in order to provide the required clearances.

However, a problem occurs if the fingers of the fork twist as a result of processes which are applied during production. For example, during heat treatment which follows the machining processes and which is necessary to harden the surfaces that are in sliding contact with one another, the metal undergoes expansions and contractions which will unpredictably result in minor distortions (such as the above-mentioned twisting) and which cannot be corrected via the use of the end cap.

While this arrangement shown in FIGS. 10-12, has proven very effective if successfully manufactured, a drawback arises that the number of units which must be scraped or re-worked due to the above-mentioned distortions can be so high as to render the manufacture of this type of arrangement excessively time consuming and therefore expensive.

SUMMARY OF THE INVENTION

An embodiment of the invention eliminates the effects of the above-mentioned post processing by virtue of the fingers being constrained in a box configuration. The embodiment also is such that single internal step is readily machined as opposed to the double groove in the fork type of arrangement discussed above. In connection with the slider block, the difficulty involved in the machining of the tight toleranced grooves in the slider block such as used in the above discussed prior art arrangement, is significantly reduced through the use of a slider which features a pair of positive steps in place of the grooves.

A first aspect of the invention resides in a cam follow arrangement comprising: a rectangular-shaped through hole formed in an end portion of a ram member, the through hole having first and second opposed ends and a pair of parallel sides; a slider disposed in the rectangular-shaped through hole and configured to be slidable back and forth along the parallel sides toward and away the first and second ends; and a spring disposed between the slider and the first end of the rectangular-shaped through hole to bias the slider toward the second end of the rectangular-shaped through hole.

In an embodiment of this cam follower arrangement the first and second opposed ends and the pair of parallel sides are contiguous. In another embodiment, the ram member may have a longitudinal axis with the through hole extending normally with respect to the axis.

In a further embodiment, the through hole has a stepped cross section and the slider comprises first and second halves. The first half is configured to have a stepped cross-section which compliments the cross-section of the through hole. The second half is configured to engage a first flat major surface formed about the mouth of the through hole and to slide there along as the slider moves back and forth between the first and second ends. The stepped configuration of the through hole and the stepped cross-section of the first half of the slider are such, in one embodiment, as to define surfaces which slide on each other.

In a yet further embodiment, at least the surfaces which slide on each other and the first flat major surface are heat treated and/or chemically hardened to obviate wear to due sliding of the slider within the through hole.

The above may be embodied by a first cam follower supported on the slider, and a second cam follower supported on a portion of the end portion of the ram adjacent the through hole. The first and second cam followers are configured to engage a cam member therebetween and wherein the spring is adapted to bias the first and second cam followers into contact with the cam.

In accordance with an embodiment of the invention the first and second cam followers may respectively comprise first and second rollers which roll along sides of the cam they engage. The first and second cam followers may, in this embodiment, be respectively secured to the slider and the end portion, via first and second threaded shafts which respectively extend through first and connection bores formed in the slider and the end portion of the ram. In another embodiment, the first and second cam followers are configured to be supplied with lubricant via the shafts on which they are supported. This may be embodied by the first and second threaded shafts having lubricating bores formed therein and are connected to lubricating lines.

In an embodiment the ram is essentially cylindrical and the end portion is essentially hemi-cylindrical. The ram forms part of a machine adapted for shaping containers.

A second aspect of the invention resides in a method of forming a cam follower arrangement comprising: forming a rectangular through hole opening in one end of a ram member so as to have opposed first and second ends and a pair of parallel sides; forming the opening to have a stepped cross section; forming a slider of first and second halves, the first half having a stepped configuration which is essentially complementary with the stepped cross-section of the opening; disposing the first and second halves in the opening and slider in the rectangular opening and connecting the first and second halves together so that the slider can move back and forth along the rectangular opening; and disposing a spring between a first end of the rectangular opening and a portion of the slider so as to bias the slider toward the second end of the rectangular opening.

In an embodiment of this method a flat surface may be formed about the rectangular opening on which the second half of the slider is configured to slide.

The above method may be embodied by supporting a first cam follower on the slider; supporting a second cam follower on a portion of the ram member; and arranging the first and second cam followers to engage a cam therebetween and have the spring bias the first and second cam followers into engagement with the cam. Supplying the first and second cam followers with lubricant is achieved using passages which extend through shafts on which the cam followers are operatively supported.

BRIEF DESCRIPTION OF THE DRAWINGS

A better understanding of the various aspects of the present invention will develop as a detailed description of an embodiment of the invention is given with reference to the appended drawings wherein:

FIG. 10 is a perspective view showing the structure depicted in FIGS. 4-9, assembled into an operative unit;

FIG. 11 is a partially sectioned view of the arrangement shown in FIG. 10;

FIG. 12 is an enlarged view showing details of a spring pack which is circled in FIG. 11;

DETAILED DESCRIPTION OF THE PREFERRED EMBODIMENTS

Figure 1:
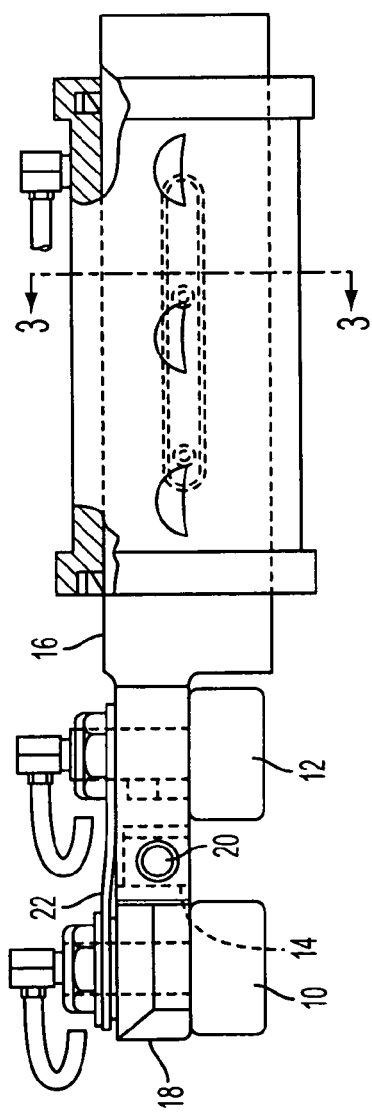
FIG. 1 is a side elevation of a prior art arrangement discussed in the opening paragraphs of the instant disclosure.
Figure 3:
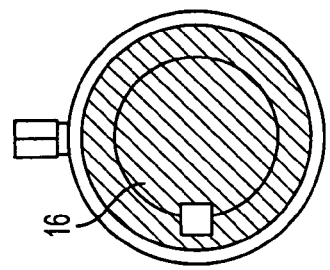
FIG. 3 is a sectional view taken along section line 3-3 of FIG. 1.
Figure 2:
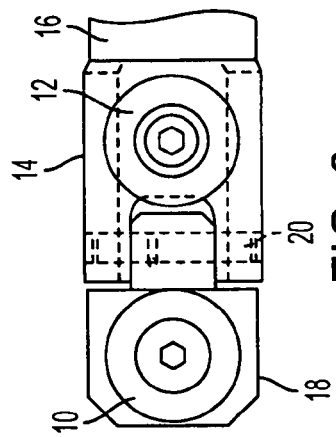
FIG. 2 is a plan view of an end portion of the arrangement shown in FIG. 1.
Figure 5:
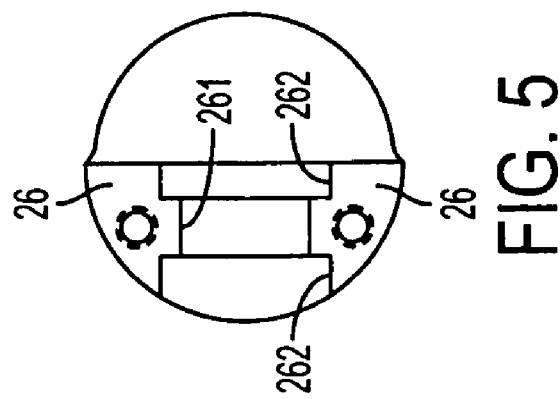
FIG. 5 is an end view of the fork arrangement depicted in FIG. 4.
Figure 4:
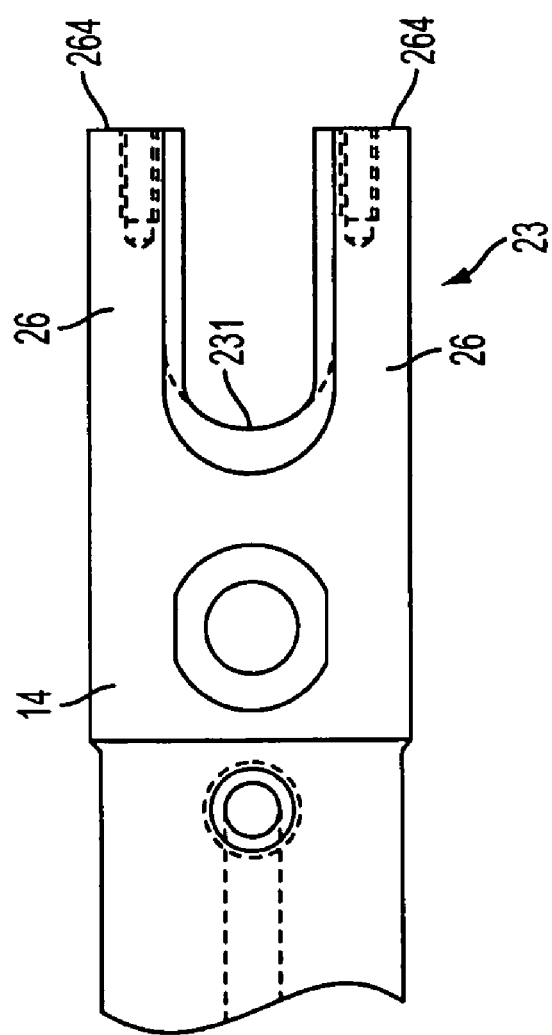
FIG. 4 is a plan view of a second prior art arrangement discussed in the opening paragraphs of the instant disclosure.
Figure 6:
FIGS. 6 and 7 are section and plan views respectively of an end cap member which is used with the arrangement shown in FIGS. 4 and 5.
Figure 7:
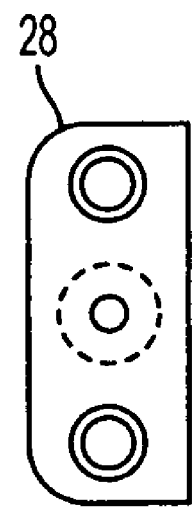
Figure 8:
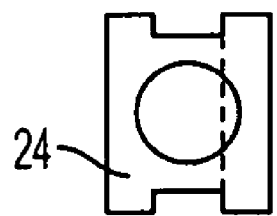
FIGS. 8 and 9 are end and plan views respectively of a slider which is used in the prior art arrangement depicted in FIG. 4.
Figure 9:
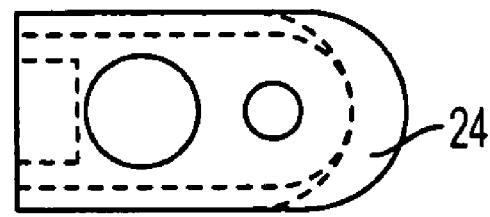
Figure 13:
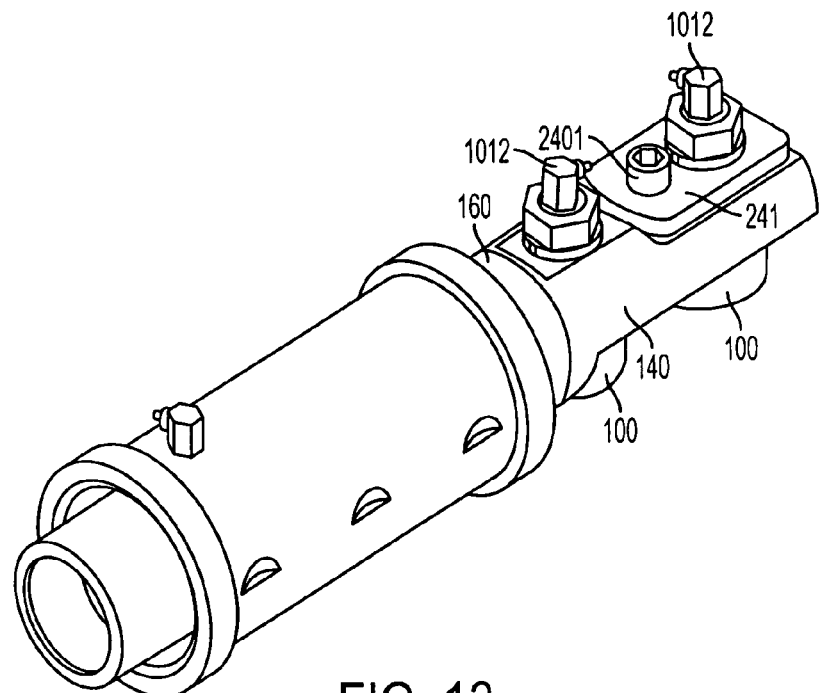
FIGS. 13, 14 and 15 are respectively perspective, partially sectioned plan and partially sectioned side views of an embodiment of the present invention.
Figure 14:
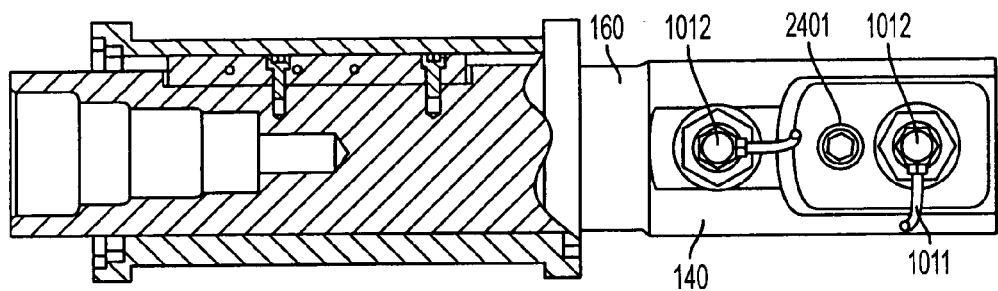
Figure 15:
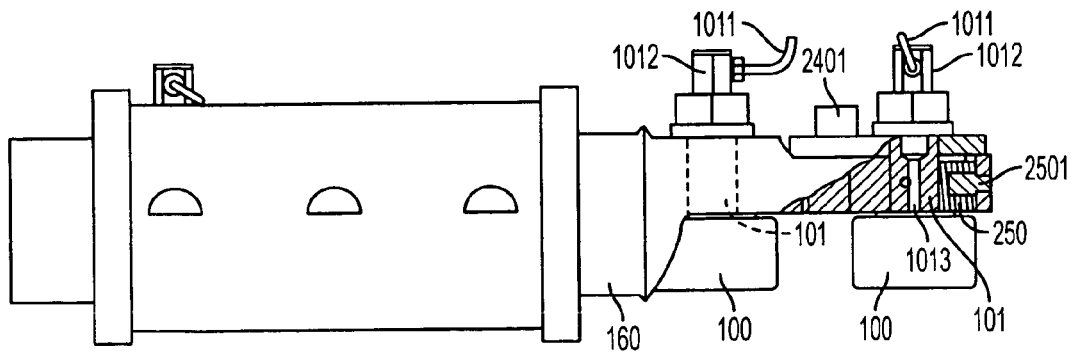
Figure 16:
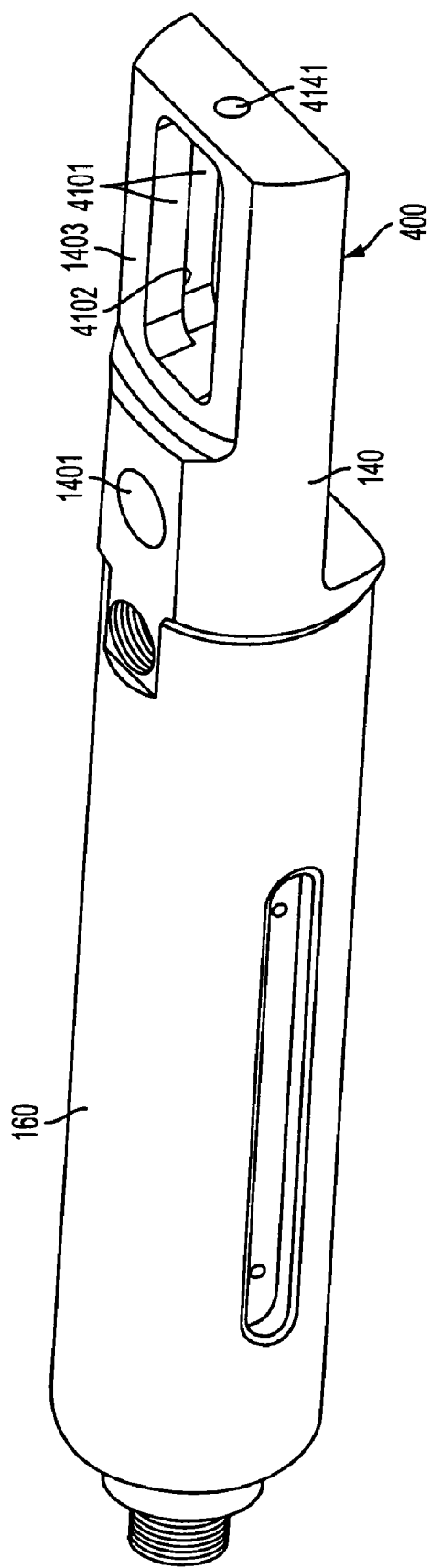
FIG. 16 is a perspective view showing structural features of a portion of the arrangement depicted in FIGS. 13-15.

FIGS. 13-22 show constructional aspects of an embodiment of the invention. As best seen in FIG. 16 the end member 140 of the ram shaft 160 on which the cam followers 100 are supported, is formed with one-piece rectangular frame 400 having a rectangular stepped through hole or bore 410. This rectangular frame 400 comprises two parallel side walls 412 and two parallel end walls 414.

Figure 17:
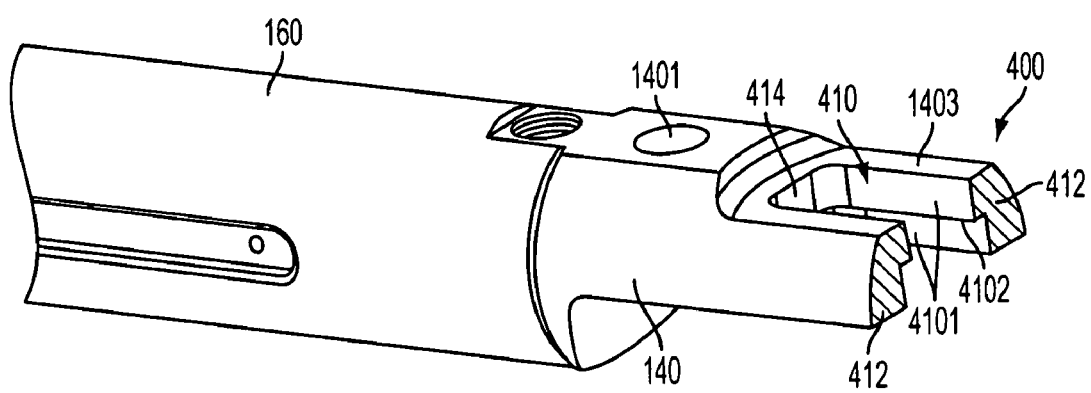
FIG. 17 is a perspective view similar to that shown in FIG. 16 showing the rectangular hole configuration depicted in FIG. 16 partially sectioned.
Figure 18:
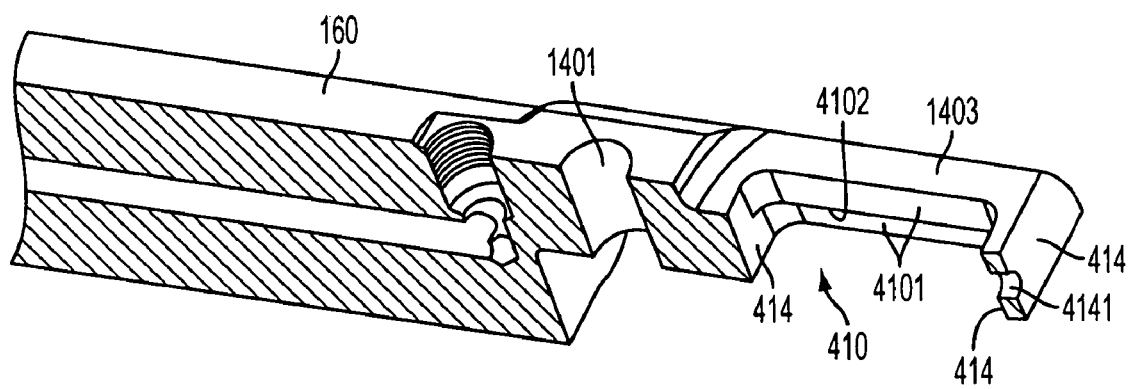
FIGS. 18 and 19 are perspective view of other sectioning of the rectangular hole configuration and associated ram arrangement shown in FIG. 16.
Figure 19:
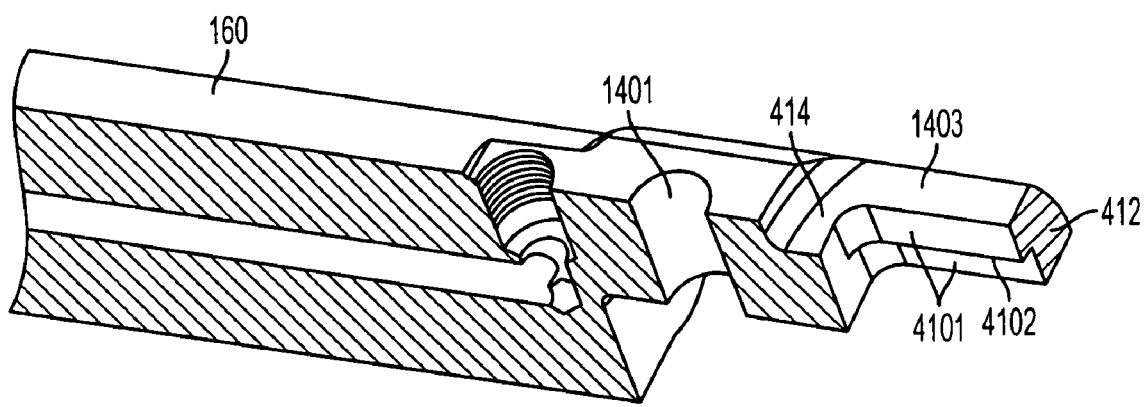

The stepped nature of the stepped through bore 410 is best seen in FIGS. 17 and 19, and comprises two upright walls and an interconnecting horizontal wall. In this embodiment, the upright 4101 walls and interconnecting horizontal wall 4102, are machined flat and at right angles with respect to one another.

Figure 20:
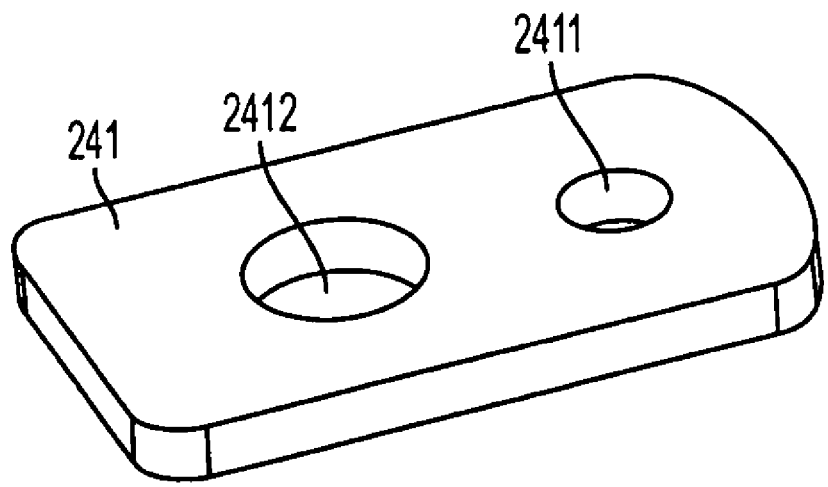
FIGS. 20 and 21 are perspective views of the elements which comprise the slider in accordance with the embodiment of the invention.
Figure 21:
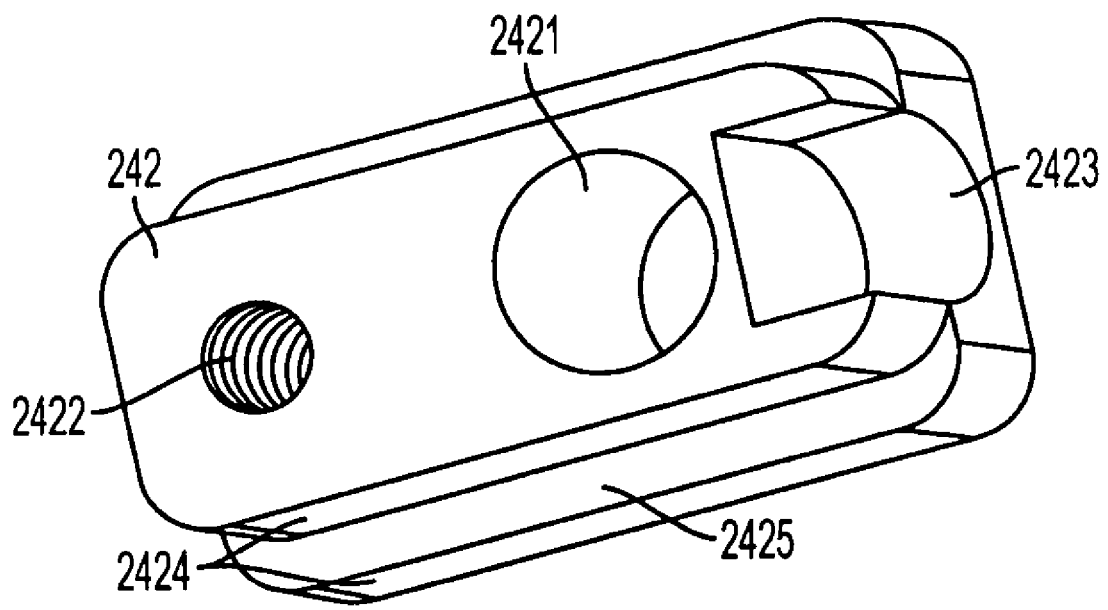
Figure 22:
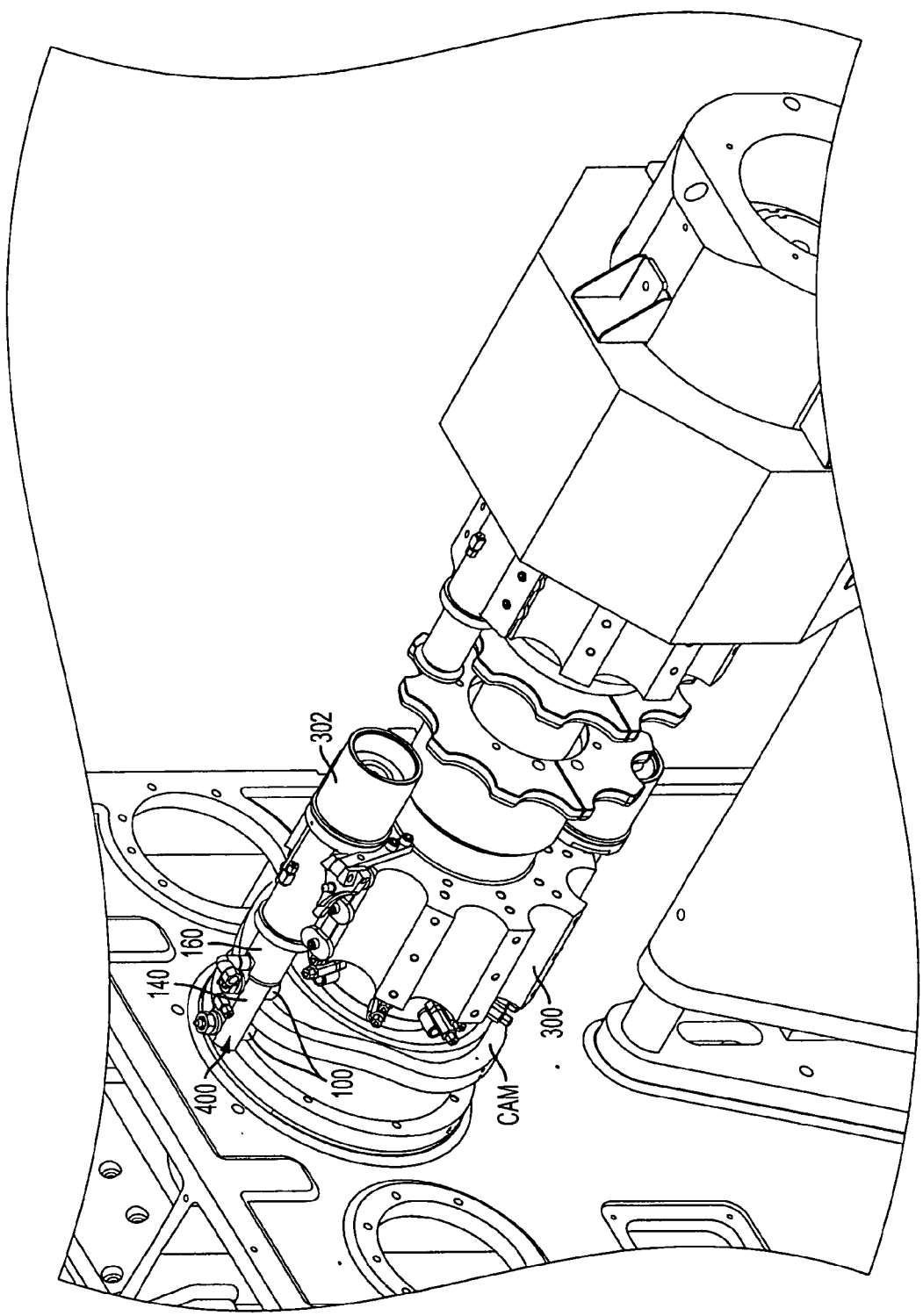
FIG. 22 is a perspective view showing an embodiment of the invention disposed in an operative position.

The slider 240, which is operatively disposed in the stepped through bore 410 is, in this embodiment, formed of two pieces. FIG. 20 depicts the upper plate 241 which is configured to be connected to a stepped lower member 242 shown in FIG. 21. This two piece construction allows each piece to be machined and surface hardened where necessary. The lower piece 242 is formed with a through hole 2421, a tapped hole 2422 and a spring pack receiving recess 2423. The side walls 2424 and interconnecting horizontal wall 2425 are dimensioned and configured to slidingly engage respectively with the walls 4101 and 4102 (see FIG. 17) of the stepped through bore 410.

The tapped bore 2422 is used to fasten the two pieces 241, 242 together. After the stepped lower member 242 is disposed in through the lower opening of the stepped opening of the stepped through bore 410 (as seen in FIG. 17), a spring pack 250 is disposed in position in the recess 2423 and the upper plate 241 is disposed on the upper surface 1403 of the box frame 400, which is machined flat and chemically hardened in the same manner as the other surfaces which are exposed to sliding contact. The two pieces are then connected together by a bolt 2401 which passes through a through hole 2411 in the upper plate 241 and which is threadedly received in the tapped bore 2422 (see FIGS. 13-15 and 20-21).

As best seen in FIG. 15, the spring pack 250 includes at least one coil spring and a guide pin 2501 which has a stepped configuration and which is configured so that the smaller diameter end portion seats in a through bore 4141 (see FIG. 16) formed in the end of the end wall 414 of the rectangular frame 400.

The openings 2412 and 2421 (FIGS. 20-21) which are respectively formed in the upper plate 241 and the stepped lower member 242, are configured to receive a bearing shaft 101 of the outboard cam following elements 100.

An opening 1401 (see FIG. 16 for example) formed in the end 140 inboard of the rectangular frame is configured to receive the other bearing shaft of the inboard cam follower element 100. Although not illustrated per se, the bearing shafts 101 of the cam follower elements 100 are provided with channels/bores 1013 (see FIG. 15) which transfer lubricant from lubricant supply conduits 1011 via grease fitting 1012 to internal rolling and contact elements of cam following elements 100.

The following table summarizes some of the features and the associated advantages which are gained from the above disclosed embodiment.

TABLE

| Feature | Prior Art | Embodiment | Advantage Gained |
| --- | --- | --- | --- |
| Slide Block | Single-piece | 2-piece | Ease of Mfg due to stepped design. Upper block has greater surface area for greater stability and load sharing. |
| Ram shaft | Forked Design | Box frame Design | Box frame end more stable both before and after post heat treating processing |

Although the present invention has been described with reference to only a limited number of embodiments, it will be self-evident to those skilled in the art to which the present invention pertains or most closely pertains, that various modifications and changes can be envisaged without departing from the scope of the invention.

What is claimed is:

1. A cam follower arrangement comprising:
   a rectangular-shaped through hole formed in an end portion of a ram member, the through hole having first and second opposed ends and a pair of parallel sides;
   a slider disposed in the rectangular-shaped through hole and configured to be slidable back and forth along the parallel sides toward and away the first and second ends; and
   a spring disposed between the slider and the first end of the rectangular-shaped through hole to bias the slider toward the second end of the rectangular-shaped through hole,
   wherein the rectangular-shaped through hole has a stepped cross section and wherein the slider comprises first and second halves, the first half being configured to have a stepped cross-section which compliments the cross-section of the through hole, the second half being configured to engage a first flat major surface formed about the mouth of the through hole and to slide there along as the slider moves back and forth between the first and second ends.

2. A cam follower arrangement as set forth in claim 1, wherein the first and second opposed ends and the pair of parallel sides are contiguous.

3. A cam follower arrangement as set forth in claim 1, wherein the ram member has a longitudinal axis and wherein the through hole extends normally with respect to the axis.

4. A cam follower arrangement as set forth in claim 1, wherein the stepped configuration of the through hole and the stepped cross-section of the first half of the slider are such as to define surfaces which slide on each other.

5. A cam follower arrangement as set forth in claim 4, wherein at least the surfaces which slide on each other and the first flat major surface are heat treated and/or chemically hardened to obviate wear to due sliding of the slider within the through hole.

6. A cam follower arrangement as set forth in claim 1, further comprising:
   a first cam follower supported on the slider; and
   a second cam follower supported on the portion of the end portion of the ram adjacent the stepped through hole.

7. A cam follower arrangement as set forth in claim 6, wherein the first and second cam followers are configured to engage a cam member there between and wherein the spring is adapted to bias the first and second cam followers into contact with the cam.

8. A cam follower arrangement as set forth in claim 6, wherein the first and second cam followers respectively comprise first and second rollers.

9. A cam follower arrangement as set forth in claim 5, wherein the first and second cam followers are respectively secured to the slider and the end portion, via first and second threaded shafts which respectively extend through first and connection bores formed in the slider and the end portion of the ram.

10. A cam follower arrangement as set forth in claim 6, wherein the first and second cam followers are configured to be supplied with lubricant.

11. A cam follower arrangement as set forth in claim 9, wherein the first and second threaded shafts have lubricating bores formed therein and are connected to lubricating lines.

12. A cam follower arrangement as set forth in claim 1, wherein the ram is essentially cylindrical and the end portion is essentially semi-cylindrical.

13. A cam follower arrangement as set forth in claim 1, wherein the ram forms part of a machine adapted for shaping containers.

* * * * *